Patented Oct. 10, 1922.

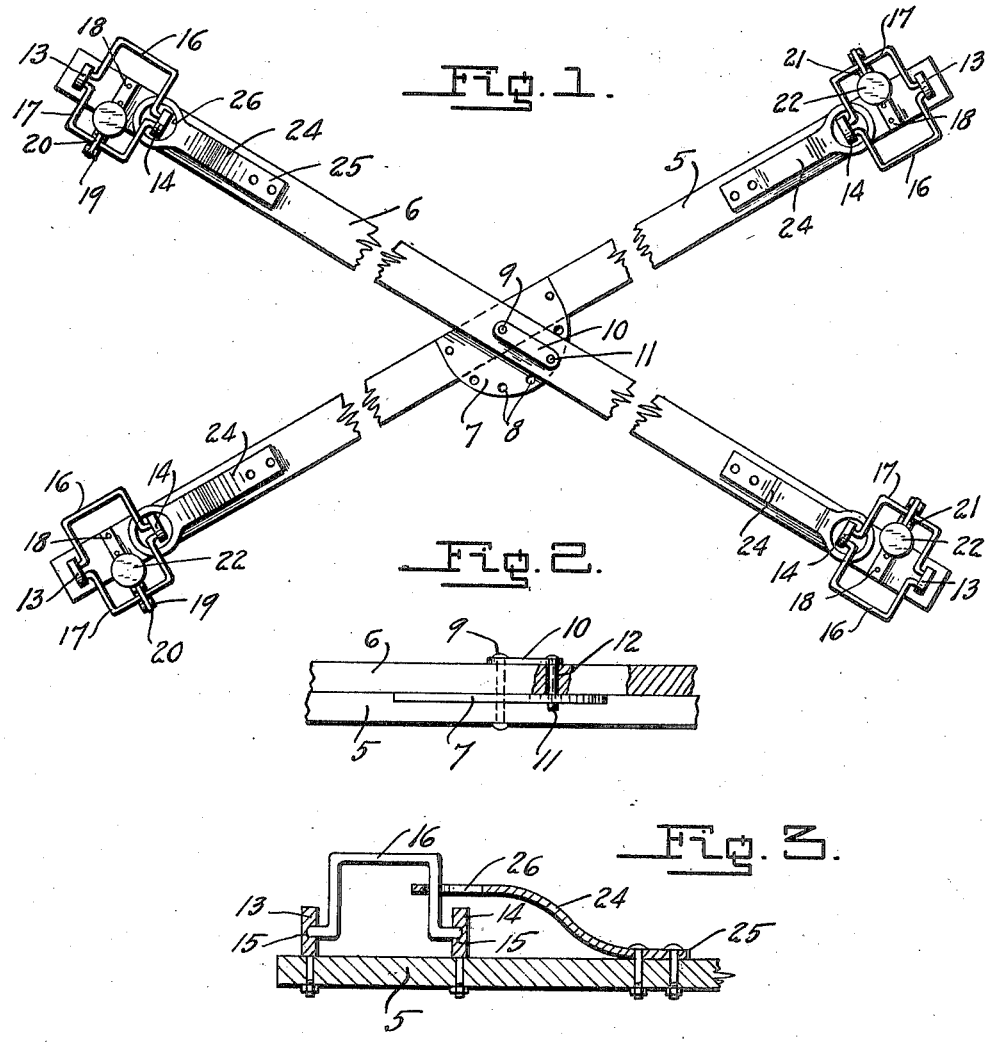

1,431,648

UNITED STATES PATENT OFFICE.

WILLIAM R. FRYE, OF NEW FLORENCE, MISSOURI.

TRAPPING DEVICE.

Application filed May 17, 1922. Serial No. 561,666.

*To all whom it may concern:*

Be it known that I, WILLIAM R. FRYE, a citizen of the United States, residing at New Florence, in the county of Montgomery and State of Missouri, have invented certain new and useful Improvements in Trapping Devices, of which the following is a specification, reference being had to the accompanying drawings.

This invention relates to trapping devices and has for its object to provide a device of this character wherein a plurality of trapping means may have a common supporting member.

It is another object of the invention to provide a trapping device of this character capable of being positioned at cross runways so as to position the trapping means within each runway or path adjacent the point of intersection of said paths.

It is a further object of the invention to provide trapping means of this character capable of being adjusted and inserted in a hole or cave to not only provide trapping means within the cave, but trapping means at the mouth of the cave.

It is also an object of the invention to provide trapping means of this character wherein the traps are operable independently of each other.

It is a still further object of the invention to provide a trapping device of this character including a pair of supporting members movably connected to each other and provided with means for holding said members in various adjusted positions relative to each other.

With these and other objects in view, the invention consists in the improved construction and arrangement of parts to be hereinafter more particularly described, fully claimed and illustrated in the accompanying drawings, in which:—

Figure 1 is a plan view of a trapping device constructed in accordance with an embodiment of the invention, the various trapping means being shown in their set positions;

Figure 2 is a fragmentary side elevation of the connection of the supporting bars and the means for holding said bars in adjusted positions;

Figure 3 is a fragmentary sectional view of one of the traps and spring in their inoperative or closed positions; and Figure 4 is a side elevation of the trigger mechanism.

Referring to the drawings, 5 and 6 designate supporting bars, said bars may be made any length desired and of a width sufficient to properly support trapping means. The bar 5 has secured to its central portion an arcuate plate 7, said plate having a series of openings 8 adjacent its periphery. The bar 6 is pivoted at its central portion to the central portion of the bar 5 by means of a pivot pin 9. Secured to the bar by means of the pivot pin 9 is a leaf spring 10 having a dog 11 connected to the end thereof, said dog being adapted to extend through an opening 12 provided in the bar 6 to permit the dog to enter the openings 8 and by means of which the bars 5 and 6 may be held in various adjusted positions relative to each other.

By pivoting the bars at their central portions to each other, a substantially X-shaped supporting member is provided, said bars being movable to cause movement of the corresponding ends of the bars toward or away from each other. Each end portion of each of the bars 5 and 6 is provided with trapping means, said trapping means comprising studs 13 and 14, said studs having one end thereof reduced and threaded and adapted to extend through openings provided in the end portions of the bars, the studs being arranged in spaced relation to each other corresponding to the width of a trap jaw. Each of the studs is provided with openings 15 adjacent its upper end.

Trap jaws 16 and 17 are provided for use in connection with the studs, said trap jaws being of conventional form and having their end portions extended outwardly in opposite directions and passed through the registering openings of the studs 13 and 14. By this means both jaws are pivoted at the same point for movement in the well known manner.

Connected to each end portion of the bars 5 and 6 between the studs 13 and 14 and projecting from one side of the bar is an arm 18 having its end portion 19 extended at right angles to the arm and bifurcated to provide ears for the reception of a trigger finger 20. Disposed inwardly of the end portion 19 is a pair of ears 21 adapted to receive the shank of a trigger plate 22, the shank being provided with the usual recess 23 for the reception of the trigger finger 20.

To permit movement of the jaws toward each other a spring 24 is provided, said spring being bent substantially Z-shaped, one spring being provided for each trapping means or jaw and is disposed inwardly of the jaws at each end portion of the bars 5 and 6. The end portion 25 of the spring is secured to the bar, while the opposite or offset end portion is enlarged and provided with an opening 26 adapted to receive the inner end portions of the jaws and the stud 14, so as to permit movement of said spring over the stud, and cause movement of the jaws toward each other.

Each trapping means is set in the well known manner by swinging the jaws outwardly to compress the spring 24 and extending the trigger finger 20 over one of the jaws and into engagement with the trigger plate to hold the jaws open and set. Upon movement of the trigger plate by the animal the jaws are swung toward each other. This trapping device provides four trapping means having one support or base member in the form of the bars 5 and 6. These bars, in view of the novel adjusting feature of the plate 7 and dog 11, are capable of being adjusted relative to each other so as to move the trapping means carried by the corresponding end portions of the bars toward or away from each other. This feature permits the trap to be set for runways of various lengths, or placed at the intersection of runways by swinging the arm to form a cross. The device may also be used for trapping in holes or dens by swinging the bars toward each other and inserting a pair of the trapping means into the hole, leaving the remaining pair exteriorly of the hole so that in case the animal escapes being caught by the trapping means in the hole it is hardly possible that he will escape the trapping means disposed exteriorly of the hole and vice versa. By this arrangement it is practically impossible for an animal traveling in the vicinity of the trap to escape being caught. On the other hand it is possible for more than one animal to be caught by this device, as the trapping means are operable independently of each other.

When the device is not in use the adjusting means may be operated so as to permit movement of the arms toward each other so as to fold the same in a compact form and permit the device to be conveniently carried by the trapper. All of these features are possessed by a device that is composed of a few number of parts which in view of their simplicity will operate indefinitely, with entire satisfaction.

Another important feature of this trap is that it requires only one chain to fasten the same and will answer the purpose of four single traps. It will be found especially useful on prairies. It can be easily hidden and cannot be turned over by the animal.

What is claimed is:—

1. A trapping device comprising bars having trapping means disposed at each of their end portions, said bars being movably connected at their central portions to each other.

2. A trapping device comprising bars having trapping means disposed at each of their end portions, said bars being movably connected at their central portions to each other, and means carried by said bars at their central portions for holding said bars in various adjusted positions relative to each other.

3. A trapping device comprising bars having trapping means disposed at their end portions, one of said bars having an arcuate plate disposed at its central portion, said plate having a series of openings, the remaining bar being pivoted at its central portion to the first mentioned bar, and provided with a spring pressed dog adapted to engage the plate to hold the bars in various adjusted positions relative to each other.

4. A trap comprising a plurality of bars pivoted to each other at their central portions, spaced studs carried by each end portion of said bars, trap jaws pivoted between said studs and arranged to move laterally of the bars, a leaf spring carried by each end portion of said bars adjacent the inner ends of the jaws, one end of said spring being secured to the bar, the opposite end of said spring being adapted to engage the inner end portions of the jaws, an arm carried by said end portion of the bars between the jaws of said end portions, and a trigger mechanism carried by said arm and arranged to engage one of said jaws.

In testimony whereof I hereunto affix my signature.

WILLIAM R. FRYE.